Aug. 16, 1932.                  J. E. WHITE                 1,872,540
                                 FERRULE
                          Filed Dec. 27, 1927
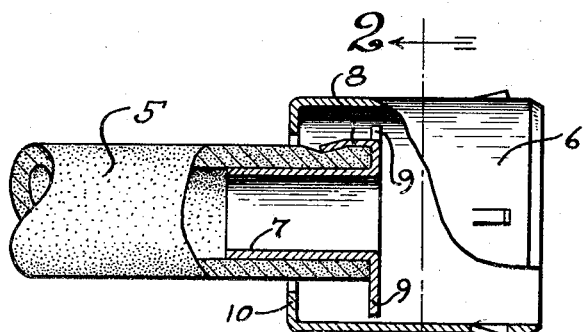 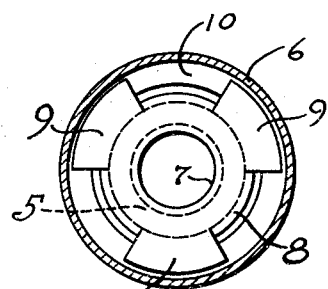
Fig. 1.                                      Fig. 2.
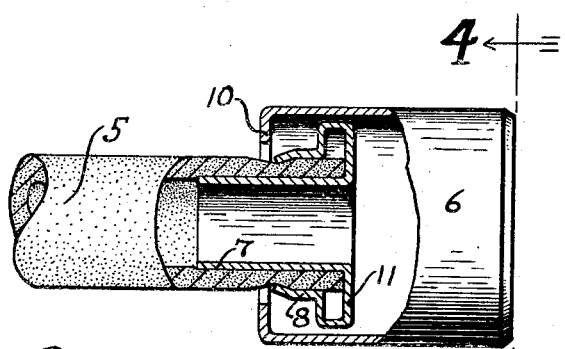 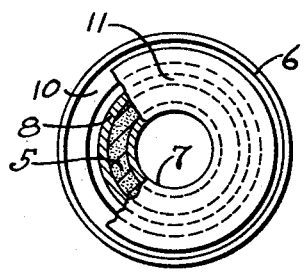
Fig. 3.                                      Fig. 4.
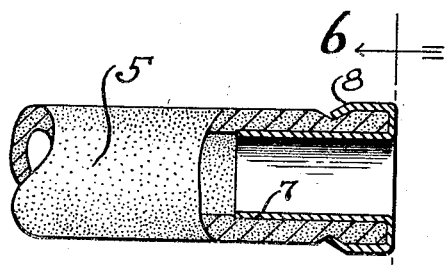 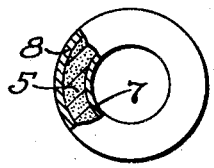
Fig. 5.                                      Fig. 6.
INVENTOR
JAY E. WHITE.
BY
ATTORNEY Patented Aug. 16, 1932

1,872,540

UNITED STATES PATENT OFFICE

JAY E. WHITE, OF DETROIT, MICHIGAN, ASSIGNOR TO CHRYSLER CORPORATION, OF DETROIT, MICHIGAN, A CORPORATION OF DELAWARE

FERRULE

Application filed December 27, 1927. Serial No. 242,955.

This invention relates to ferrules, and more particularly to ferrules for use on cables, tubing or the like.

It is the primary object of my invention to provide a ferrule for the ends of hollow cables which will secure the cable end within an apertured retaining member into which the cable may be extended.

Another object is to provide such a ferrule on cable ends to prevent the ends from deteriorating or fraying.

It is still a further object to provide a ferrule of cheap and economical construction, such as of a single stamping.
With the above and other objects in view, my invention consists in the arrangement, combination and construction of the various parts of my improved device as described in the specification, claimed in my claims and shown in the accompanying drawings, in which:

Fig. 1 is a side elevation of a cable and retaining member embodying my improved ferrule, with certain parts broken away to illustrate portions in section.

Fig. 2 is a sectional view taken on line 2—2 of Fig. 1.

Fig. 3 is a view corresponding to Fig. 1, showing a modification of my invention.
Fig. 4 is an end view taken on line 4—4 of Fig. 3.

Fig. 5 is a side elevation of the cable and ferrule, showing another modification of my invention, certain parts being broken away to illustrate portions in section.

Fig. 6 is an end view of Fig. 5 looking in the direction indicated by the arrows 6—6 on Fig. 5.

Referring to Figs. 1 and 2 of the drawings, I have shown a tubular member such as a hollow cable 5 extending into a retaining member 6 which is adapted to be received on any member to which the cable 5 is intended to be connected and which forms no part of my present invention other than in combination as a retaining means for my improved ferrule. A ferrule comprising an inner tubular portion 7 and outer return bent portion 8 is positioned on the end of the hollow cable. The return bent end is embedded in the cable by a crimping operation after the ferrule has been placed on the end of the tube 5, in order to secure the ferrule to the cable in the form of my invention shown in Fig. 1. It will be noted that this ferrule is stamped of a single piece and as originally formed is provided with a flange 9 which has portions that are bent toward the body of the ferrule alternately around the periphery thereof. The retaining member 6 as shown is provided with an inwardly extending flange 10 around its inner end so that the retaining member may be slipped on the cable from the left hand end, as shown in the drawing until the flange 10 engages the segmental flange 9.

It will be quite apparent that in addition to providing a means for securing the end of the cable within a retaining member, my improved ferrule also preserves the cable end and prevents it from fraying or deteriorating.

In the modification shown in Fig. 3 and 4, I have shown a single radial flange 11 extending outwardly and completely around the periphery of the ferrule which is bent back upon itself, returning radially inwardly and axially rearwardly, forming a flange 8 crimped around the cable 5. The flange 11 engages with the lip 10 of a suitable retaining member 6 to secure the cable end therein.

In Figs. 5 and 6 I have shown my improved ferrule positioned on the end of the cable 5 with its outer portion 8 return bent against the outer wall of the cable 5, the free end of the flange 8 being crimped or rolled into the body of the cable 5. It will thus be seen that my improved ferrule may be utilized merely to protect the cable end from wear without the provision of any engaging means such as shown at 9 or 11 in Figs. 1, 2, 3 and 4.

It will be understood that my invention is not to be limited in its application to flexible hollow cables as described and illustrated herein, but is equally applicable to steel tubing, pipe, and like articles.

It will be obvious that various changes may be made in the arrangement, combination and construction of the various parts of my improved device without departing from the spirit of my invention and it is my intention to cover by my claims such changes as may be reasonably included within the scope thereof.

What I claim is:

1. A ferrule of the class described comprising an inner tubular portion, an outer portion return bent from and coaxial with said inner portion, and a lug at the junction of said inner portion and said outer portion extending outwardly from said outer portion.

2. A ferrule of the class described comprising a single integral member having an inner tubular portion, an outer portion return bent from said inner portion, and spaced lugs at the junction of said outer and inner portions.

3. In combination, a tubular member having a ferrule on one end thereof, said ferrule comprising an inner tubular portion within the tubular member and an outer return bent portion around the tubular member, the tubular member being firmly clamped between said inner and outer portions, a retaining member for said tubular member, and means on said ferrule for engagement with said retaining member.

4. In combination, a tubular member having a ferrule on one end thereof, said ferrule comprising a portion extending inwardly of said tubular member, an outer return bent portion, a radial flange at the bend of said return portion, the bend thereof being substantially at the extremity of said tubular member, a retaining member for said tubular member, and means on said retaining member for engaging said flange.

5. A ferrule of the class described comprising a tubular portion, and a segmental flange at one end of said tubular portion, alternate segments of said flange being spaced from and parallel to said tubular portion.

6. A ferrule of the class described comprising a tubular portion, a segmental flange at one end of said tubular portion having alternate segments return bent and in spaced relation to said tubular portion, the remaining segments extending radially substantially in the plane of said end of said tubular portion.

7. In combination a tubular member, a ferrule having a cylindrical part extending into said tubular member at one end, and an external segmental flange on the outer end of said cylinder, alternate segments of said flange being disposed radially substantially in the plane of the outer end of said cylinder and the remaining segments of said flange being return bent for clamping the end portions of said tubular member on said cylindrical part.

8. In combination a tubular member, a ferrule having a cylindrical part extending into said tubular member at one end, an external segmental flange on the outer end of said cylinder, alternate segments of said flange being disposed radially substantially in the plane of the outer end of said cylinder and the remaining segments of said flange being return bent for clamping the end portions of said tubular member on said cylindrical part, and a retaining member shiftably mounted on said tubular member having an annular flange in registration with radial flange segments.

9. In combination a tubular member, a ferrule having a cylindrical part extending into said tubular member at one end, and an external segmental flange on the outer end of said cylindrical part, alternate segments of said flange being disposed outwardly from said cylindrical part and the remaining segments of said flange being return bent for clamping the end portions of said tubular member on said cylindrical part.

10. A ferrule of the class described comprising a tubular member, and a flange at one end of said tubular member, portions of said flange extending axially toward the other end of said tubular member in spaced relation to the latter, the remaining portions of said flange extending outwardly from the axis of said tubular member at the end thereof.

11. In combination, a pair of tubular members one fitting within the other, and an external segmental flange on one end of one of said members, selected segments of said flange being returned bent for clamping the adjacent end portion of the other tubular member and the other segments of said flange extending outwardly from the axis of said tubular members.

12. In combination, a pair of tubular members one fitting within the other, an external segmental flange on one end of one of said members, selected segments of said flange being returned bent for clamping the adjacent end portion of the other tubular member and the other segments of said flange extending outwardly from the axis of said tubular members, and a retaining member slidably mounted on one of said tubular members and having means for engaging said outwardly extending flange segments so as to limit movement of said retaining member in one direction relative to said tubular members.

13. In combination a tubular member, a ferrule having a cylindrical part extending into said tubular member at one end, an external segmental flange on the outer end of said cylindrical part, alternate segments of said flange being disposed outwardly from said cylindrical part and the remaining segments of said flange being return bent for clamping the end portions of said tubular member on said cylindrical part, and a retaining member shiftably mounted on said tubular member and having means for engaging said outwardly extending flange segments so as to limit movement of said retaining member in one direction relative to said tubular member.

JAY E. WHITE.